(12) United States Patent
Wu et al.

(10) Patent No.: US 12,036,631 B1
(45) Date of Patent: Jul. 16, 2024

(54) COMPOSITE STATIC ROTARY TABLE AND METHOD FOR PROTECTING COMPOSITE STATIC ROTARY TABLE

(71) Applicant: Ningbo Intelligent Machine Tool Research Institute Co., Ltd. of China National Machinery Institute Group, Ningbo (CN)

(72) Inventors: Shuangfeng Wu, Ningbo (CN); Hang Shen, Ningbo (CN); Hongwei Xu, Ningbo (CN); Meng Li, Ningbo (CN); Feng Su, Ningbo (CN); Changmin Chen, Ningbo (CN); Wenkang Zhao, Ningbo (CN); Yuzhen Zhou, Ningbo (CN); Xuxiao Lin, Ningbo (CN)

(73) Assignee: NINGBO INTELLIGENT MACHINE TOOL RESEARCH INSTITUTE CO., LTD. OF CHINA NATIONAL MACHINERY INSTITUTE GROUP, Ningbo (CN)

( * ) Notice: Subject to any disclaimer, the term of this patent is extended or adjusted under 35 U.S.C. 154(b) by 0 days.

(21) Appl. No.: 18/453,132

(22) Filed: Aug. 21, 2023

(30) Foreign Application Priority Data

Feb. 20, 2023 (CN) .......................... 202310134679.2

(51) Int. Cl.
*B23Q 1/38* (2006.01)
*B23Q 1/40* (2006.01)
(Continued)

(52) U.S. Cl.
CPC ................ *B23Q 1/38* (2013.01); *B23Q 1/40* (2013.01); *B23Q 1/52* (2013.01); *F16C 32/06* (2013.01)

(58) Field of Classification Search
None
See application file for complete search history.

(56) References Cited

U.S. PATENT DOCUMENTS 5,889,397 A * 3/1999 Sanders ................. G01N 33/20
324/71.6

FOREIGN PATENT DOCUMENTS

| CN | 102242769 A | 11/2011 |
| CN | 102278372 A | 12/2011 |

(Continued)

OTHER PUBLICATIONS

CN 202310134679.2—Search Report, mailed Feb. 20, 2023, 7 pages. (with English translation).

(Continued)

*Primary Examiner* — Vicky A Johnson
(74) *Attorney, Agent, or Firm* — Getech Law LLC; Jun Ye (57) ABSTRACT

The present invention provides a composite static rotary table and a method for protecting a composite static rotary table. The composite static rotary table comprises: a housing body provided with a mounting space; a rotary table body driven by a connecting mandrel to rotate; a base, the connecting mandrel being arranged through the base; an air stopping film arranged between the rotary table body and the base; and an auxiliary supporting assembly fixedly arranged in the mounting space and configured for assisting the rotary table body to be levitated relative to the base. The present invention is intended to solve the problem of ensuring the stable non-contact rotation of the rotary body of the rotary table relative to the base, while improving the bearing capacity of the rotary table.

6 Claims, 7 Drawing Sheets

(51) Int. Cl.
*B23Q 1/52* (2006.01)
*F16C 32/06* (2006.01)

(56) References Cited

FOREIGN PATENT DOCUMENTS

| | | | |
|---|---|---|---|
| CN | 102969935 | A | 3/2013 |
| CN | 203317051 | U | 12/2013 |
| CN | 103801944 | A | 5/2014 |
| CN | 110039330 | A | 7/2019 |
| CN | 212272829 | U | 1/2021 |
| CN | 113530975 | A | 10/2021 |
| CN | 214578349 | U * | 11/2021 |
| CN | 114135583 | A | 3/2022 |
| CN | 115890275 | B | 7/2023 |
| JP | 2013188800 | A | 9/2013 |
| JP | 2017144493 | A | 8/2017 |

OTHER PUBLICATIONS

CN 202310134679.2—First Office Action, mailed Apr. 11, 2023, 7 pages. (with English translation).
CN 202310134679.2—Notice of Allowance, mailed Apr. 20, 2023, 3 pages. (with English translation).

* cited by examiner

COMPOSITE STATIC ROTARY TABLE AND METHOD FOR PROTECTING COMPOSITE STATIC ROTARY TABLE

TECHNICAL FIELD

The present invention relates to the technical field of static bearings, and in particular to a composite static rotary table and a method for protecting a composite static rotary table.

BACKGROUND

The rotary table is one of the core functional components of ultra-precise machine tools and is used as a rotating shaft of the machine tools. The rotation precision and reliability of the rotary table directly affect the performance of the ultra-precise machine tools. During the operation process of the rotary table, a non-contact gap is required to be arranged between the rotary body of the rotary table and the contact surface of the base to achieve a non-contact rotation of the rotary body relative to the base. The extremely low frictional resistance provides a high rotation precision for the aerostatic rotary table. When a certain component in the rotary table fails, or the rotary body of the rotary table bears excessive pressure, the rotary body will be in direct contact with the base, resulting in frictional damage to the rotary contact surface of the rotary table, and thus reducing the precision of the rotary table.

Thus it can be seen that how to ensure the stable non-contact rotation of the rotary body of the rotary table relative to the base while improving the bearing capacity of the rotary table becomes a problem to be solved urgently.

SUMMARY

The present invention is intended to solve the problem of ensuring the stable non-contact rotation of the rotary body of the rotary table relative to the base, while improving the bearing capacity of the rotary table.

To solve the above problems, the present invention provides a composite static rotary table, comprising: a housing body provided with a mounting space; a rotary table body driven by a connecting mandrel to rotate; a base, the connecting mandrel being arranged through the base; an air stopping film arranged between the rotary table body and the base; and an auxiliary supporting assembly fixedly arranged in the mounting space and configured for assisting the rotary table body to be levitated relative to the base.

Compared with the prior art, the embodiment can achieve the following effects: the connecting mandrel is arranged through the base; the air stopping film is arranged and extends between the base and the connecting mandrel to ensure that the base is not in contact with the connecting mandrel, and the arrangement of the air stopping film ensures a non-contact rotation of the rotary table body relative to the base; the extremely low frictional resistance provides a high rotation precision for the composite static rotary table of this embodiment. In this embodiment, when the external air supply system of the composite static rotary table fails, the air stopping film on the contact surface is damaged due to reduced air pressure, and the internal air pressure of the air stopping film is reduced. At this time, once a certain bearing capacity of the composite static rotary table is elevated, the rotary table body will be in direct contact with the base, which causes damage to the rotary contact surfaces between the rotary table body and the base, thus reducing the precision of the rotary table. Therefore, in this embodiment, an auxiliary supporting assembly is arranged in the mounting space, which operates to provide a certain auxiliary levitation force for the rotary table body. The auxiliary supporting assembly and the air stopping film cooperate to provide a levitation force for the rotary table body. Therefore, when the external air supply system fails, a certain support can be provided for the rotary table body by the levitation force provided by the auxiliary supporting assembly, such that the rotary table body is prevented from being in direct contact with the surface of the base. Since the composite static rotary table in this embodiment provides supporting force through the cooperation of the air stopping film and the auxiliary supporting assembly, the bearing capacity of the composite static rotary table in this embodiment can be further increased.

In one embodiment of the present invention, the rotary table body further comprises: a first rotary table plate fixedly connected with one end of the connecting mandrel, the base being arranged close to the first rotary table plate, and the air stopping film being arranged between the first rotary table plate and the base; and a second rotary table plate fixedly connected with the other end of the connecting mandrel and arranged close to the auxiliary supporting assembly, a non-contact gap being arranged between the second rotary table plate and the auxiliary supporting assembly.

Compared with the prior art, the embodiment can achieve the following effects: the first rotary table plate is fixedly connected with one end of the connecting mandrel, the second rotary table plate is fixedly connected with the other end of the connecting mandrel, and the first rotary table plate and the second rotary table plate are oppositely arranged; the arrangement of the first rotary table plate and the second rotary table plate further improves the rotary strength of the rotary table body.

In one embodiment of the present invention, the composite static rotary table further comprises: a motor assembly arranged between the base and the second rotary table plate and driving the connecting mandrel to rotate.

Compared with the prior art, the embodiment can achieve the following effects: the motor assembly is arranged between the base and the second rotary table plate to fully utilize the inner space of the rotary table body such that the structure of the composite static rotary table in the embodiment is more compact.

In one embodiment of the present invention, the motor assembly comprises: a motor stator; and a motor rotor, wherein the motor stator sheathes the motor rotor, and the motor rotor is fixedly connected with the connecting mandrel through a guide ring.

Compared with the prior art, the embodiment can achieve the following effects: the guide ring drives the connecting mandrel to rotate, such that the connecting mandrel, the first rotary table plate, and the second rotary table plate can rotate synchronously, therefore improving the rotary precision.

In one embodiment of the present invention, a rolling ball is arranged between the motor rotor and the guide ring.

Compared with the prior art, the embodiment can achieve the following effects: the motor rotor and the guide ring are in rolling contact through the rolling ball to provide a large-torque rotary power, such that the motor rotor and the guide ring can slide up and down relatively with a low friction.

In one embodiment of the present invention, the auxiliary supporting assembly comprises: a homogenizing plate arranged in the mounting space, a non-contact gap being provided between the homogenizing plate and the second rotary table plate; and an ultrasonic wave transducer arranged in the mounting space and abutted against the homogenizing plate.

Compared with the prior art, the embodiment can achieve the following effects: the homogenizing plate is abutted against the ultrasonic wave transducer such that the homogenizing plate can homogenize the energy of ultrasonic waves, resulting in near-field ultrasonic levitation between the first rotary table plate and the base; the near-field ultrasonic levitation generates a positive pressure by squeezing the air in an air film between a vibrating object and an object to be levitated, so as to levitate the object.

In one embodiment of the present invention, the base comprises: a base body, the connecting mandrel being arranged through the base body, and a side wall of the base body being provided with a first through hole; and a flow controller connected with the base body.

Compared with the prior art, the embodiment can achieve the following effects: the arrangement of the flow controller can control the airflow input by an external air supply system of the base, so as to control the thickness of the air stopping film more accurately, such that the composite static rotary table in this embodiment can be adapted to more different usage scenarios.

In one embodiment of the present invention, the base further comprises: a distance sensor connected with the base body and configured for detecting the thickness of the air stopping film.

Compared with the prior art, the embodiment can achieve the following effects: the distance sensor detects a distance between an upper stopper plate of the first rotary table plate and the base in real time; if the measurement detected by the distance sensor is less than a preset value, an alarm will be sent to prompt the operators to make corresponding adjustments in time, thereby reducing the risk of damage to the composite static rotary table in the embodiment.

In one embodiment of the present invention, provided is a method for protecting a composite static rotary table. The method is applicable to the composite static rotary table according to any one of the above embodiments. A distance sensor is arranged on a base, and the method comprises: powering an air supply system to generate an air stopping film between the base and a rotary table body; powering an auxiliary supporting assembly to provide a levitation force between the base and the rotary table body; reading a measurement of the distance sensor in real time; judging whether the measurement of the distance sensor is greater than or equal to a first preset value; if not, outputting an alarm signal; if yes, then judging whether the measurement of the distance sensor is less than or equal to a second preset value; if yes, keeping the composite static rotary table in operation; and if not, outputting an alarm signal.

Compared with the prior art, the embodiment can achieve the following effects: the distance sensor detects a distance between an upper stopper plate of the first rotary table plate and the base in real time; if the measurement detected by the distance sensor is less than a preset value, an alarm will be sent to prompt the operators to make corresponding adjustments in time, thereby reducing the risk of damage to the composite static rotary table in the embodiment.

REFERENCE NUMERALS IN THE DRAWINGS

1, composite static rotary table; 100, housing body; 110, mounting space; 200, rotary table body; 210, first rotary table plate; 220, second rotary table plate; 300, base; 310, base body; 311, first through hole; 312, second through hole; 320, flow controller; 330, distance sensor; 331, first sensor; 332, second sensor; 400, connecting mandrel; 500, air stopping film; 600, auxiliary supporting assembly; 610, homogenizing plate; 620, ultrasonic wave transducer; 700, motor assembly; 710, motor stator; 720, motor rotor; 730, guide ring; 740, rolling ball; 750, sealing ring; 810, first flange; 820, second flange; 830, upper stopper plate; 840, lower stopper plate; 850, first table surface.

DETAILED DESCRIPTION

In order to make the aforementioned purposes, features, and advantages of the present invention more comprehensible, examples of the present invention are described in detail.

Example I

Referring to FIGS. 1 to 7, this example provides a composite static rotary table 1, comprising: a housing body 100 provided with a mounting space 110; a rotary table body 200 driven by a connecting mandrel 400 to rotate; a base 300, the connecting mandrel 400 being arranged through the base 300; an air stopping film 500 arranged between the rotary table body 200 and the base 300; and an auxiliary supporting assembly 600 fixedly arranged in the mounting space 110 and configured for assisting the rotary table body 200 to be levitated relative to the base 300.

In this example, the housing body 100 is a shielding component, and at least part of the rotary table body 200, the connecting mandrel 400, and the auxiliary supporting assembly 600 are arranged in the mounting space 110 of the housing body 100, such that the housing body 100 can effectively prevent dust and debris from entering, therefore ensuring high-precision operation of the composite static rotary table 1 in this example. Meanwhile, the housing body 100 fixes the auxiliary supporting assembly 600, and the connecting mandrel 400 rotates to drive the rotary table body 200 to rotate relative to the base 300. At the same time, an external air supply system connected with the composite static rotary table 1 forms an air stopping film 500 between the rotary table body 200 and the base 300. The air stopping film 500 is an inflated film and is marked by dotted lines in FIG. 2. Such arrangement ensures that no contact friction is present between the rotary table body 200 and the base 300. Similarly, the connecting mandrel 400 is arranged through the base 300; the air stopping film 500 is arranged and extends between the base 300 and the connecting mandrel 400 to ensure that the base 300 is not in contact with the connecting mandrel 400, and the arrangement of the air stopping film 500 ensures a non-contact rotation of the rotary table body 200 relative to the base 300; the extremely low frictional resistance provides a high rotation precision for the composite static rotary table 1 of this example.

Furthermore, in this example, when the external air supply system of the composite static rotary table 1 fails, the air stopping film 500 on the contact surface is damaged due to reduced air pressure, and the internal air pressure of the air stopping film 500 is reduced. At this time, once a certain bearing capacity of the composite static rotary table 1 is elevated, the rotary table body 200 will be in direct contact with the base 300, which causes damage to the rotary contact surfaces between the rotary table body 200 and the base 300, thus reducing the precision of the rotary table. Therefore, in this example, an auxiliary supporting assembly 600 is arranged in the mounting space 110, which operates to provide a certain auxiliary levitation force for the rotary table body 200. The auxiliary supporting assembly 600 and the air stopping film 500 cooperate to provide a levitation force for the rotary table body 200. Therefore, when the external air supply system fails, a certain support can be provided for the rotary table body 200 by the levitation force provided by the auxiliary supporting assembly 600, such that the rotary table body 200 is prevented from being in direct contact with the surface of the base 300. Since the composite static rotary table 1 in this example provides supporting force through the cooperation of the air stopping film 500 and the auxiliary supporting assembly 600, the bearing capacity of the composite static rotary table 1 in this example can be further increased.

Figure 1:
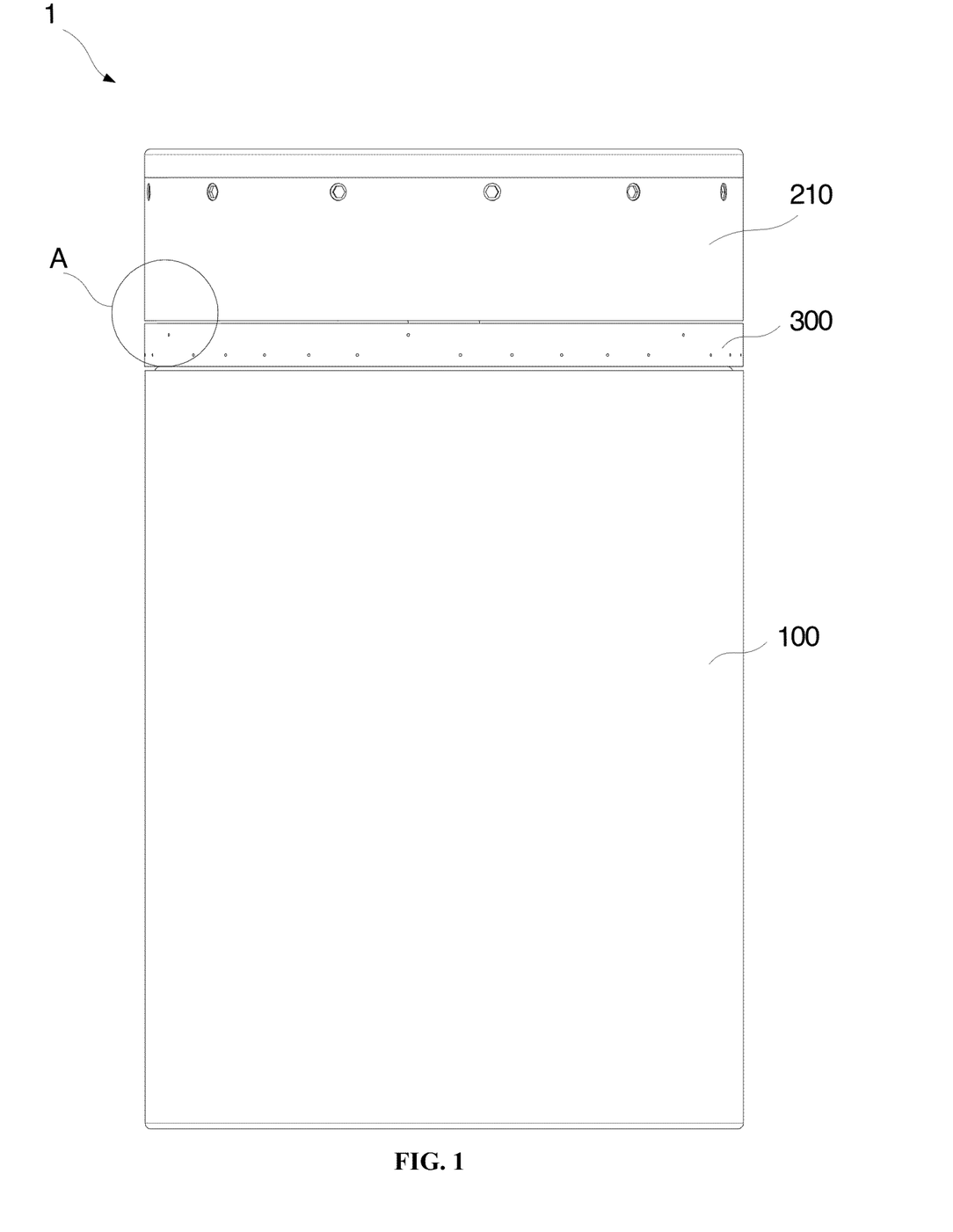
FIG. 1 is a structural schematic diagram of the composite static rotary table.
Figure 2:
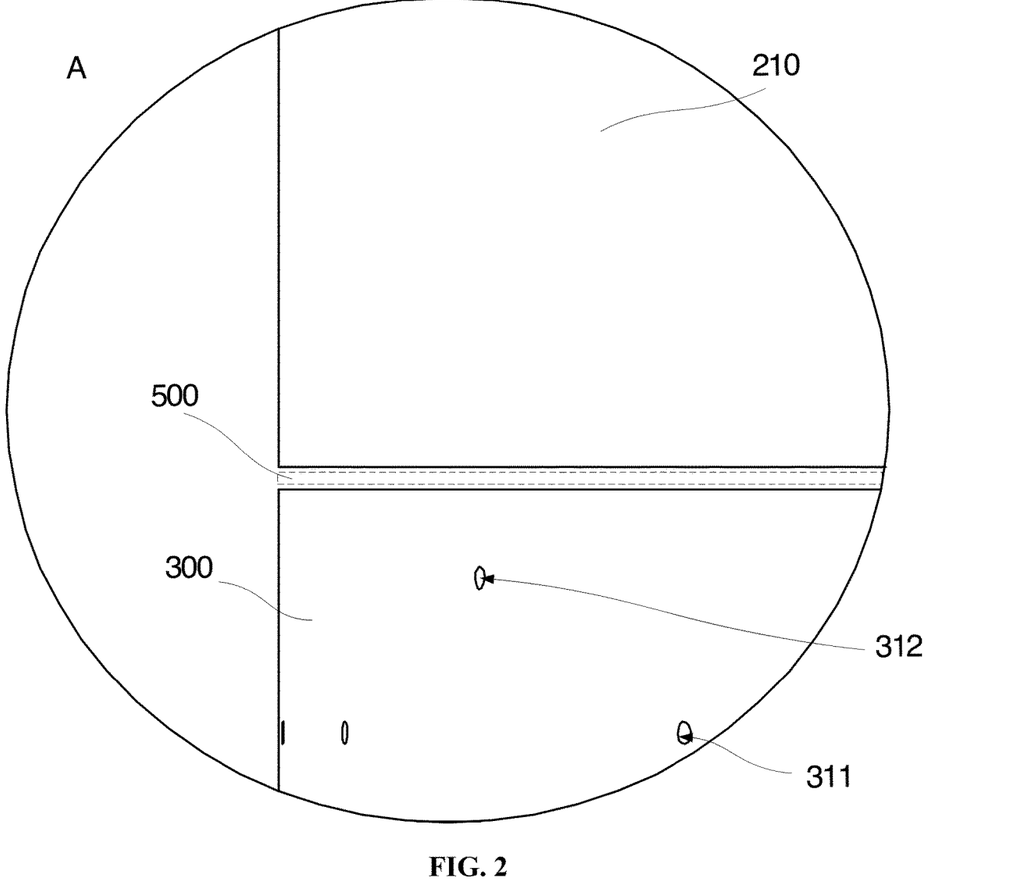
FIG. 2 is a partially enlarged view of the portion A in FIG. 1.
Figure 3:
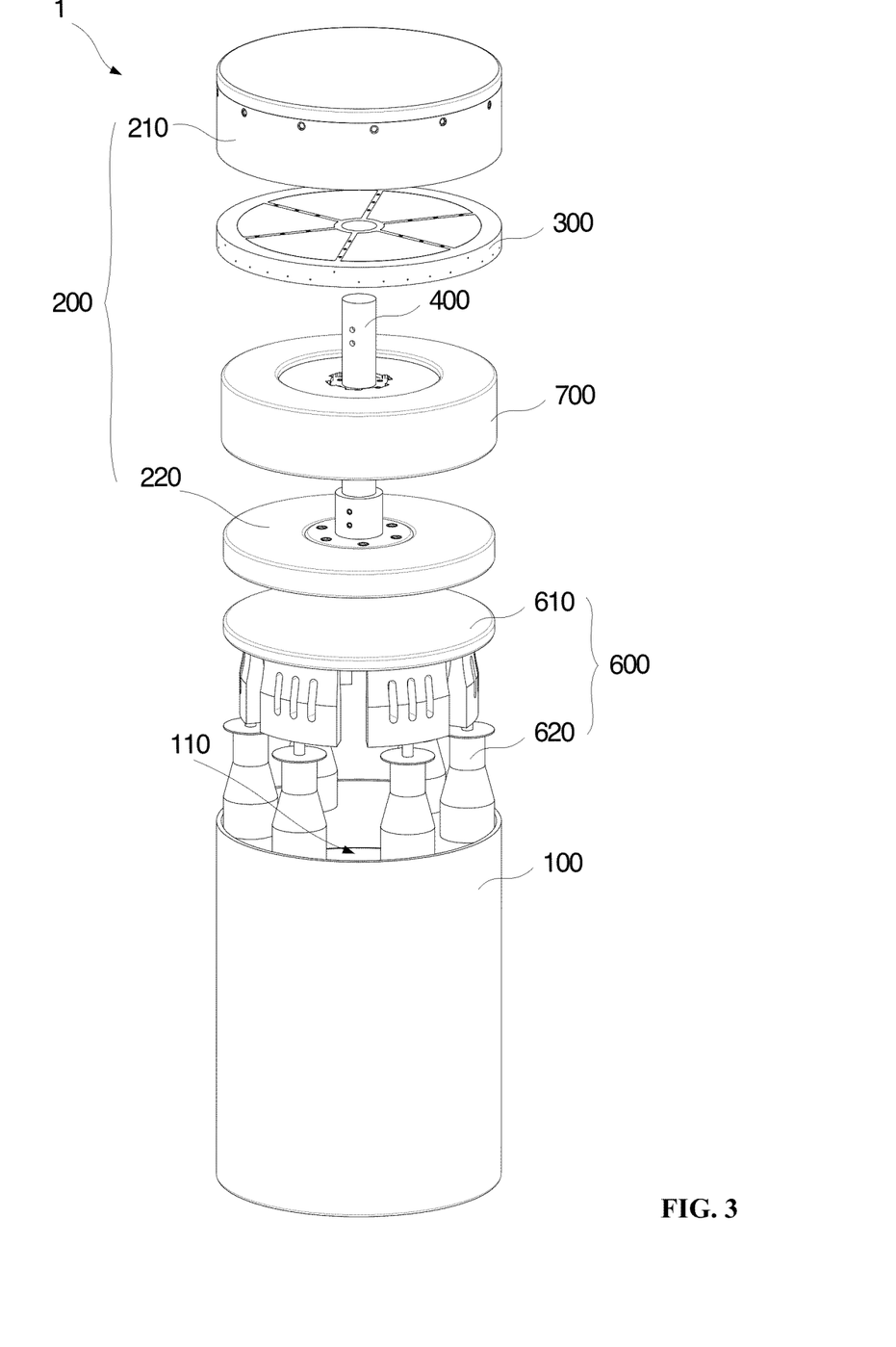
FIG. 3 is another structural schematic diagram of the composite static rotary table.
Figure 5:
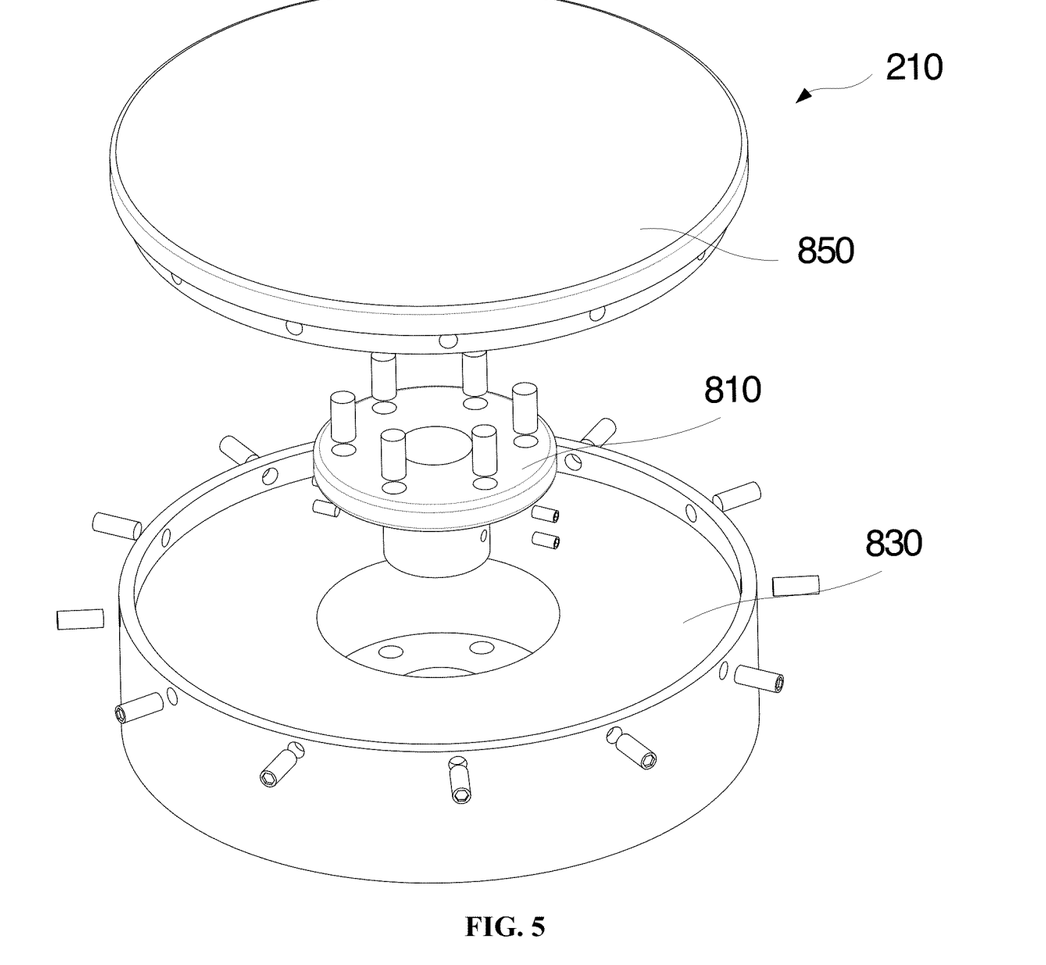
FIG. 5 is a structural schematic diagram of the first rotary table plate.
Figure 7:
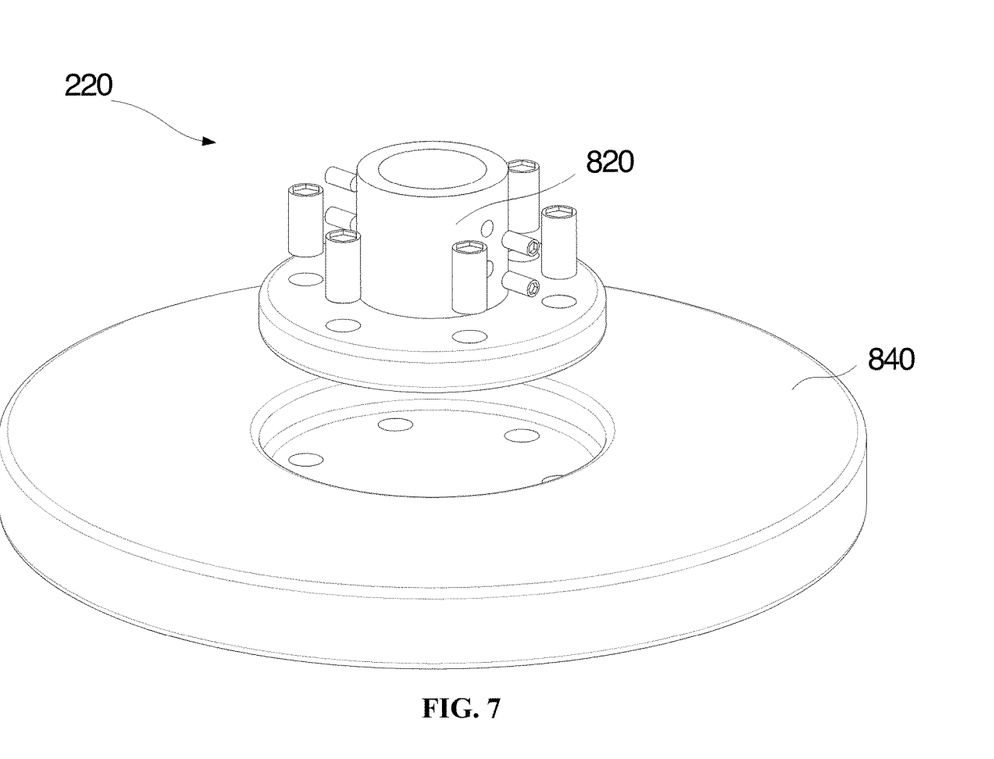
FIG. 7 is a structural schematic diagram of the second rotary table plate.

Furthermore, referring to FIGS. 3, 5, and 7, the rotary table body 200 further comprises: a first rotary table plate 210 fixedly connected with one end of the connecting mandrel 400, the base 300 being arranged close to the first rotary table plate 210, and the air stopping film 500 being arranged between the first rotary table plate 210 and the base 300; and a second rotary table plate 220 fixedly connected with the other end of the connecting mandrel 400 and arranged close to the auxiliary supporting assembly 600, a non-contact gap being arranged between the second rotary table plate 220 and the auxiliary supporting assembly 600.

The first rotary table plate 210 is fixedly connected with one end of the connecting mandrel 400, the second rotary table plate 220 is fixedly connected with the other end of the connecting mandrel 400, and the first rotary table plate 210 and the second rotary table plate 220 are oppositely arranged. The arrangement of the first rotary table plate 210 and the second rotary table plate 220 further improves the rotary strength of the rotary table body 200. The first rotary table plate 210 is composed of a first table surface 850, a first flange 810, and an upper stopper plate 830, the first flange 810 is arranged in the upper stopper plate 830 and fixedly connects the first table surface 850 with the upper stopper plate 830 through screws, and the first flange 810 also fixedly connects the first rotary table plate 210 with the connecting mandrel 400 through screws, so as to ensure that the connecting mandrel 400 and the first rotary table plate 210 can rotate synchronously, thus improving the rotary precision. The second rotary table plate 220 is composed of a lower stopper plate 840 and a second flange 820, the second flange 820 is fixedly connected with the lower stopper plate 840 through screws, and the second flange 820 is fixedly connected with the connecting mandrel 400 through screws, so as to ensure that the connecting mandrel 400, when rotating, drives the second rotary table plate 220 to rotate, such that the connecting mandrel 400, the first rotary table plate 210, and the second rotary table plate 220 can rotate synchronously, thus improving the rotary precision.

Furthermore, the auxiliary supporting assembly 600 comprises: a homogenizing plate 610 arranged in the mounting space 110, a non-contact gap being provided between the homogenizing plate 610 and the second rotary table plate 220; and an ultrasonic wave transducer 620 arranged in the mounting space 110 and abutted against the homogenizing plate 610.

The auxiliary supporting assembly 600 is specifically an ultrasonic vibration device in this example, and an alternating voltage is applied to the ultrasonic wave transducer 620 such that the ultrasonic wave transducer 620 generates an ultrasonic wave; the homogenizing plate 610 is abutted against the ultrasonic wave transducer 620 such that the homogenizing plate 610 can homogenize the energy of ultrasonic waves, resulting in near-field ultrasonic levitation between the first rotary table plate 210 and the base 300; the near-field ultrasonic levitation generates a positive pressure by squeezing the air in an air film between a vibrating object and an object to be levitated, so as to levitate the object.

In brief, the ultrasonic wave transducer 620 can convert the electric energy into an ultrasonic wave; when the ultrasonic wave is transmitted to the homogenizing plate 610, the air above the homogenizing plate 610 is squeezed. That is, a positive pressure is generated in the air film between the homogenizing plate 610 and an object to be levitated, so as to levitate the object. That is, the lower stopper plate 840 of the second rotary table plate 220 is levitated and is not in contact with the homogenizing plate 610, and the upper stopper plate 830 of the first rotary table plate 210 is levitated and is not in contact with the base 300.

The operation of the ultrasonic wave transducer 620 can provide an auxiliary supporting force for the rotary table body 200 during the operation of the rotary table, and can also improve the bearing capacity of the composite static rotary table 1 in this example, thereby increasing the bearing range of the composite static rotary table 1 in this example.

Furthermore, a plurality of ultrasonic wave transducers 620 are arranged in this example, and are arranged around the circumference of the homogenizing plate 610 at uniform intervals, thus improving the homogenizing effect of the homogenizing plate 610 on the ultrasonic wave. Preferably, six ultrasonic wave transducers 620 are arranged to further increase the amount of the ultrasonic wave converted by the ultrasonic wave transducers 620, and improve the auxiliary supporting levitation force provided by the auxiliary supporting assembly 600 in this example, thereby further improving the bearing capacity of the composite static rotary table 1 in this example.

Figure 4:
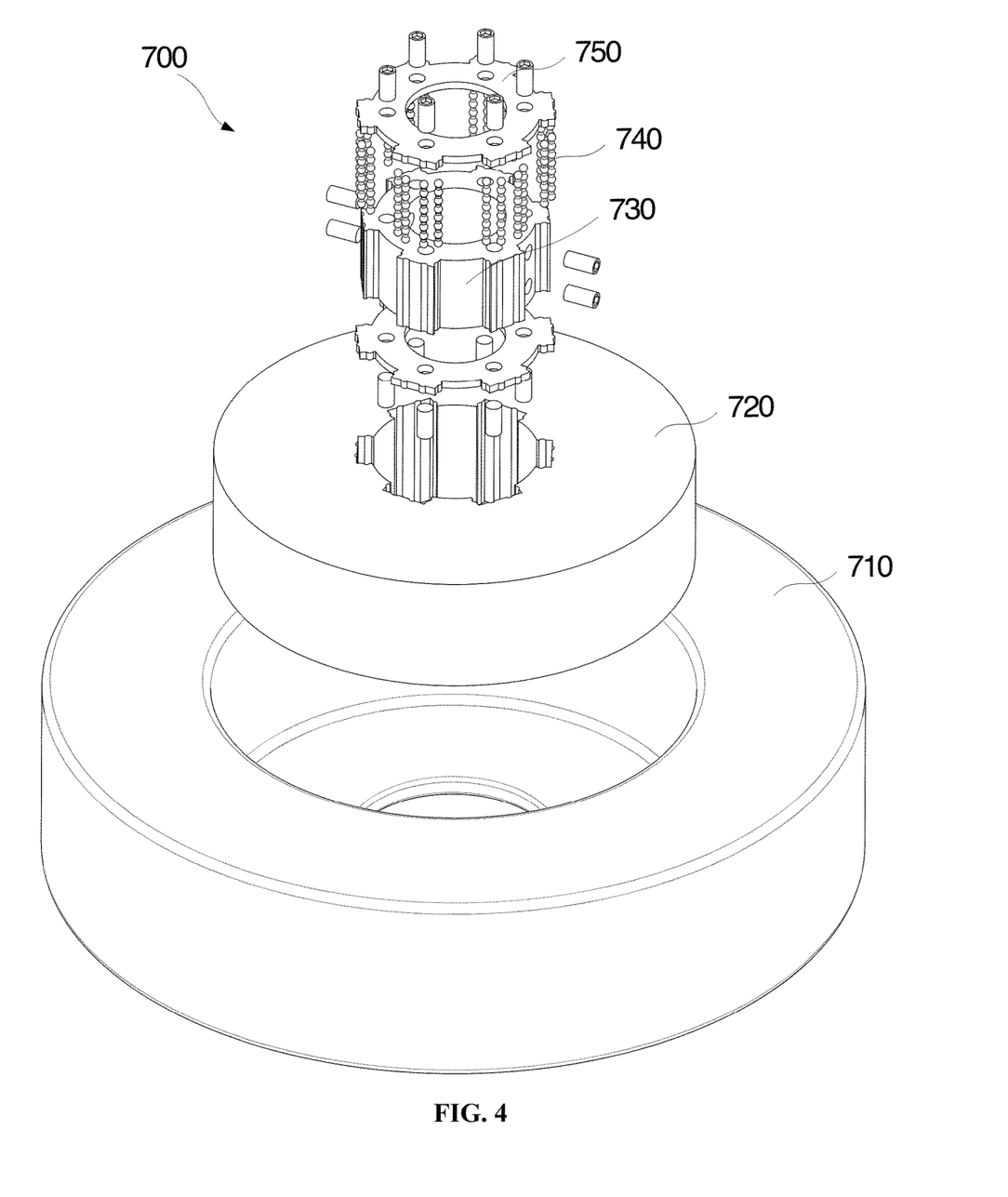
FIG. 4 is a structural schematic diagram of the motor assembly.

Furthermore, the composite static rotary table 1 further comprises: a motor assembly 700 arranged between the base 300 and the second rotary table plate 220 and driving the connecting mandrel 400 to rotate.

The motor assembly 700 comprises: a motor stator 710; and a motor rotor 720, wherein the motor stator 710 sheathes the motor rotor 720, and the motor rotor 720 is fixedly connected with the connecting mandrel 400 through a guide ring 730.

The guide ring 730 is specifically a spline-shaped guide ring; a rolling ball 740 is arranged between the motor rotor 720 and the guide ring 730; the motor rotor 720 and the guide ring 730 are in rolling contact through the rolling ball 740 to provide a large-torque rotary power, such that the motor rotor 720 and the guide ring 730 can slide up and down relatively with a low friction.

Meanwhile, the arrangement of the rolling ball 740 provides a large-torque rotary power. Since the composite static rotary table 1 in this example often operates in a large-torque rotary power environment, it is more likely that the first rotary table plate 210 cannot be supported by the inflated film, which causes the first rotary table plate 210 in contact with the surface of the base 300, thereby reducing the rotary precision. Therefore, in combination with the auxiliary supporting assembly 600 arranged in this example, the composite static rotary table 1 can operate under a higher bearing capacity, and the arrangement of the guide piece in the motor assembly 700 enables the composite static rotary table 1 in this example to maintain a non-contact gap between the first rotary table plate 210 and the base 300 even the composite static rotary table 1 is in a large-torque rotary power and high-bearing strength operating environment for a long time, thereby ensuring the rotary precision of the composite static rotary table 1.

Furthermore, a plurality of rolling balls 740 are provided, and the plurality of rolling balls 740 are arranged between the guide ring 730 and motor rotor 720 to further improve the rotary torque of the motor rotor 720, and ensure a smooth relative up-and-down sliding of the motor rotor 720 and the guide ring 730. The ends of the guide ring 730 are provided with a sealing ring 750 to prevent external dust and debris from entering the motor rotor 720, thereby ensuring the rotary precision of the motor rotor 720.

Figure 6:
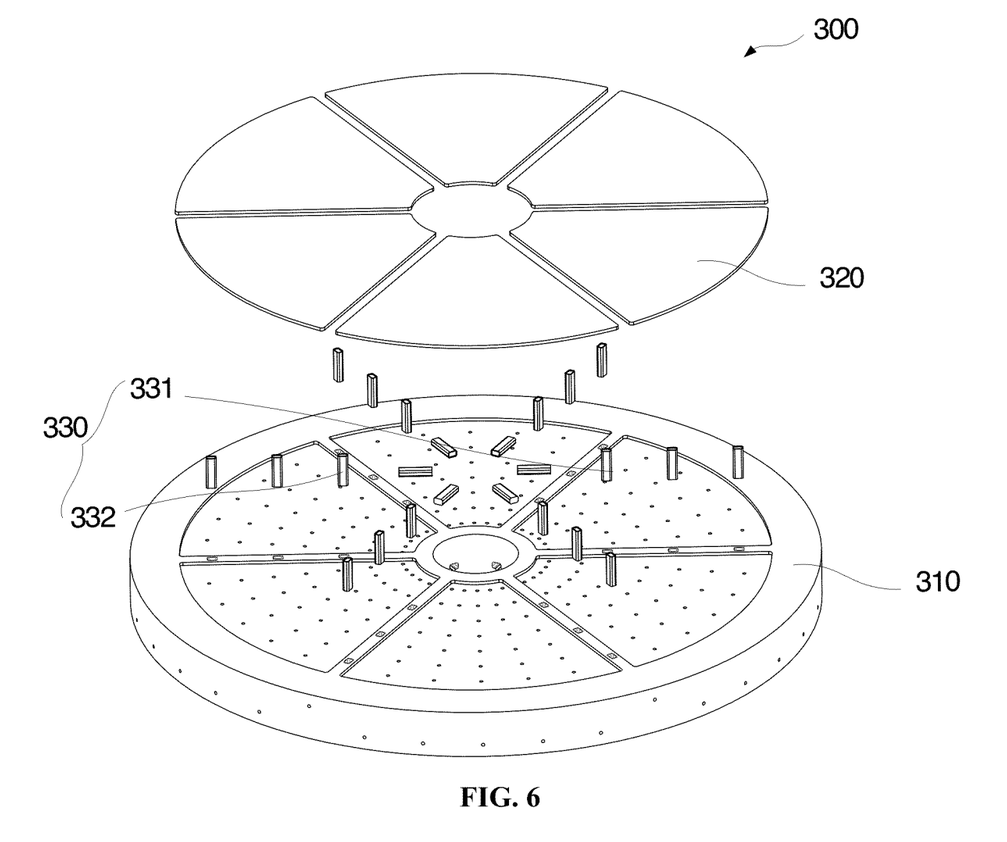
FIG. 6 is a structural schematic diagram of the base.

The base 300 comprises: a base body 310, the connecting mandrel 400 being arranged through the base body 310, and a side wall of the base body 310 being provided with a first through hole 311; and a flow controller 320 connected with the base body 310.

The base 300 further comprises: a distance sensor 330 connected with the base body 310 and configured for detecting the thickness of the air stopping film 500.

The first through hole 311 is configured for connecting with an air inlet pipeline of the external air supply system such that the air stopping film 500 is generated between the base 300 and the first rotary table plate 210. Furthermore, the side wall of the base body 310 is further provided with a second through hole 312, the first through hole 311 and the second through hole 312 are arranged in parallel, and the second through hole 312 is a reserved hole arranged for powering the distance sensor 330.

The distance sensor 330 detects a distance between an upper stopper plate 830 of the first rotary table plate 210 and the base 300; if the measurement detected by the distance sensor 330 is less than a preset value, an alarm will be sent to prompt the operators to make corresponding adjustments in time, thereby reducing the risk of damage to the composite static rotary table 1 in the example.

Example II

In this example, provided is a method for protecting a composite static rotary table 1. The method is applicable to the composite static rotary table 1 according to any one of the above examples. A distance sensor 330 is arranged on a base 300, and the method comprises: powering an air supply system to generate an air stopping film 500 between the base 300 and a rotary table body 200; powering an auxiliary supporting assembly 600 to provide a levitation force between the base 300 and the rotary table body 200; reading a measurement of the distance sensor 330 in real time; judging whether the measurement of the distance sensor 330 is greater than or equal to a first preset value; if not, outputting an alarm signal; if yes, then judging whether the measurement of the distance sensor 330 is less than or equal to a second preset value; if yes, keeping the composite static rotary table 1 in operation; and if not, outputting an alarm signal.

The first preset value and the second preset value are factory defaults of the composite static rotary table 1 in this example, and can be set according to the actual operating conditions by the operators. In this example, the first preset value is a minimum value that the air stopping film 500 may reach. That is, the first preset value is a minimum threshold value. The second preset value is a maximum value that the air stopping film 500 may reach. That is, the second preset value is a maximum threshold value. The air supply system and the auxiliary supporting assembly 600 cooperate to provide a levitation supporting force for the rotary table body 200. The distance sensor 330 monitors a distance between the first rotary table plate 210 and the base 300 in real time. When the distance is greater than or equal to the first preset value, it is indicated that the composite static rotary table 1 is still in non-contact rotation; then whether the distance value is less than or equal to the second preset value is judged; if the distance value is less than or equal to the second preset value, it is indicated that the first rotary table board 210 is in non-contact rotation at a proper position, and the supporting force provided by the cooperation of the auxiliary supporting assembly 600 and the air stopping film 500 provided by the air supply system is not excessive, thereby ensuring that the composite static rotary table 1 in this example operates normally.

Furthermore, referring to FIG. 6, six orientations are distributed on the base body 310. The six orientations are arranged at uniform intervals, and a plurality of distance sensors 330 are arranged on straight lines where the orientations are located, so as to reduce the measurement error of the distance sensors 330 and improve the detection accuracy of the distance sensors 330. Meanwhile, the distance sensors 330 in any two oppositely arranged orientations are designated as a first sensor 331 and a second sensor 332. For example, a first orientation is arranged in the positive direction of the X axis, a second orientation is arranged in the negative direction of the X axis; a first sensor 331 is arranged at the first orientation, a second sensor 332 is arranged on the second orientation; a first numerical value detected by the first sensor 331 and a second numerical value detected by the second sensor 332 are read in real time. A third preset value is further set in the composite static rotary table 1 in this example. The third preset value is an inclination deviation value, and whether the absolute difference between the first numerical value and the second numerical value is less than the third preset value is judged in real time; if yes, it is indicated that the first rotary table plate 210 is within a certain allowable error and is not in an inclined rotation; and if not, it is indicated that the first rotary table plate 210 is in an inclined state, and the composite static rotary table 1 is very likely to bear a unilateral high pressure. As such, the composite static rotary table 1 sends an alarm to prompt the operators to further prevent the composite static rotary table 1 in this example from being damaged.

Although the present invention is disclosed above, the present invention is not limited thereto. Various changes and modifications may be made by those skilled in the art without departing from the spirit and scope of the present invention. Therefore, the protection scope stated in the claims shall prevail with regard to the protection scope of the present invention.

What is claimed:

1. A composite static rotary table, comprising:
   a housing body provided with a mounting space;
   a rotary table body driven by a connecting mandrel to rotate;
   a base, the connecting mandrel being arranged through the base;
   an air stopping film arranged between the rotary table body and the base; and
   an auxiliary supporting assembly fixedly arranged in the mounting space and configured for assisting the rotary table body to be levitated relative to the base,
   wherein the rotary table body further comprises:
   a first rotary table plate fixedly connected with one end of the connecting mandrel,
   the base being arranged adjacent to the first rotary table plate, and the air stopping film being arranged between the first rotary table plate and the base; and
   a second rotary table plate fixedly connected with the other end of the connecting mandrel and arranged adjacent to the auxiliary supporting assembly, a non-contact gap being arranged between the second rotary table plate and the auxiliary supporting assembly;
   wherein the auxiliary supporting assembly comprises:
   a homogenizing plate arranged in the mounting space, a non-contact gap being provided between the homogenizing plate and the second rotary table plate; and
   an ultrasonic wave transducer arranged in the mounting space and abutted against the homogenizing plate.

2. The composite static rotary table according to claim 1, further comprising:
   a motor assembly arranged between the base and the second rotary table plate and driving the connecting mandrel to rotate.

3. The composite static rotary table according to claim 2, wherein the motor assembly comprises:
   a motor stator; and
   a motor rotor, the motor stator sheathing the motor rotor, and the motor rotor being fixedly connected with the connecting mandrel through a guide ring.

4. The composite static rotary table according to claim 3, wherein
   a rolling ball is arranged between the motor rotor and the guide ring.

5. The composite static rotary table according to claim 1, wherein the base comprises:
   a base body, the connecting mandrel being arranged through the base body, and a side wall of the base body being provided with a first through hole; and
   a flow controller connected with the base body.

6. A method for protecting a composite static rotary table, wherein the method is applicable to the composite static rotary table according to claim 1; a distance sensor of the composite static rotary table is arranged on a base; the method comprises:
   powering an air supply system to generate an air stopping film between the base and a rotary table body;
   powering an auxiliary supporting assembly to provide a levitation force between the base and the rotary table body;
   reading a measurement of the distance sensor in real time;
   judging whether the measurement of the distance sensor is greater than or equal to a first preset value;
   if not, outputting an alarm signal;
   if yes, then judging whether the measurement of the distance sensor is less than or equal to a second preset value;
   if yes, keeping the composite static rotary table in operation; and
   if not, outputting an alarm signal.

* * * * *